(12) United States Patent  
Sagong et al.

(10) Patent No.: US 10,607,109 B2
(45) Date of Patent: Mar. 31, 2020

(54) METHOD AND APPARATUS TO PERFORM MATERIAL RECOGNITION AND TRAINING FOR MATERIAL RECOGNITION

(71) Applicant: SAMSUNG ELECTRONICS CO., LTD., Suwon-si (KR)

(72) Inventors: Donghoon Sagong, Suwon-si (KR); Minjung Son, Suwon-si (KR); Hyun Sung Chang, Seoul (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 15/592,461

(22) Filed: May 11, 2017

(65) Prior Publication Data

US 2018/0107896 A1    Apr. 19, 2018

(30) Foreign Application Priority Data

Nov. 16, 2016    (KR) .................. 10-2016-0152428

(51) Int. Cl.
*G06K 9/62* (2006.01)
*G06K 9/46* (2006.01)
(Continued)

(52) U.S. Cl.
CPC ......... *G06K 9/6212* (2013.01); *G06K 9/4604* (2013.01); *G06K 9/4628* (2013.01); *G06K 9/4642* (2013.01); *G06K 9/4671* (2013.01); *G06K 9/6256* (2013.01); *G06K 9/66* (2013.01); *G06T 7/11* (2017.01); *G06T 7/187* (2017.01);
(Continued)

(58) Field of Classification Search
CPC .. G06K 9/62; G06K 9/46; G06K 9/66; G06K 9/6212; G06K 9/4642; G06K 9/4628; G06K 9/6256; G06K 9/4671; G06K 9/4604; G06K 9/6201; G06K 9/342; G06T 7/11; G06T 7/187; G06T 2207/20081;
(Continued)

(56) References Cited

U.S. PATENT DOCUMENTS 7,734,071 B2    6/2010    Heisele
7,853,072 B2    12/2010   Han
(Continued)

FOREIGN PATENT DOCUMENTS

JP    2015-191666 A    11/2015
KR    10-2006-0007901 A    1/2006
(Continued)

OTHER PUBLICATIONS

Lipson, Pamela, Eric Grimson, and Pawan Sinha. "Configuration based scene classification and image indexing." Computer Vision and Pattern Recognition, 1997. Proceedings., 1997 IEEE Computer Society Conference on. IEEE, 1997.*

(Continued)

*Primary Examiner* — Bobbak Safaipour
(74) *Attorney, Agent, or Firm* — NSIP Law

(57) ABSTRACT

Provided are method and apparatuses related to material recognition and training. A training apparatus for material recognition generates training data associated with a material by generating a texture image having a texture attribute from an object image and recognizing material information from the texture image using a material model.

25 Claims, 14 Drawing Sheets

(51) Int. Cl.
*G06T 7/11* (2017.01)
*G06T 7/187* (2017.01)
*G06K 9/66* (2006.01)
G06N 3/04 (2006.01)
G06N 3/08 (2006.01)

(52) U.S. Cl.
CPC ........... *G06N 3/0454* (2013.01); *G06N 3/084* (2013.01); *G06T 2207/20021* (2013.01); *G06T 2207/20081* (2013.01)

(58) Field of Classification Search
CPC .......... G06T 2207/20021; G06N 3/084; G06N 3/0454; G01N 21/84
See application file for complete search history.

(56) References Cited

U.S. PATENT DOCUMENTS

| | | | |
|---|---|---|---|
| 8,582,896 B2 | 11/2013 | Ionita | |
| 8,737,725 B2 | 5/2014 | Wang | |
| 9,025,866 B2* | 5/2015 | Liu | G06K 9/00577 382/159 |
| 9,171,213 B2 | 10/2015 | Bulan | |
| 9,317,752 B2 | 4/2016 | Bulan | |
| 9,691,161 B1* | 6/2017 | Yalniz | G06K 9/6201 |
| 10,152,780 B2* | 12/2018 | Hsu | G06T 7/13 |
| 2010/0104158 A1* | 4/2010 | Shechtman | G06K 9/46 382/131 |
| 2010/0226564 A1* | 9/2010 | Marchesotti | G06K 9/4671 382/159 |
| 2015/0023552 A1* | 1/2015 | Rosen | G06K 9/00362 382/103 |
| 2016/0162760 A1 | 6/2016 | Skaff | |
| 2016/0358374 A1* | 12/2016 | Ju | G06T 17/20 |

FOREIGN PATENT DOCUMENTS

| | | |
|---|---|---|
| KR | 10-0963744 B1 | 6/2010 |
| KR | 10-1030613 B1 | 4/2011 |
| KR | 10-1485512 B1 | 1/2015 |
| KR | 10-2015-0108577 A | 9/2015 |
| KR | 10-2015-0136225 A | 12/2015 |

OTHER PUBLICATIONS

Sharan, Lavanya, et al. "Recognizing materials using perceptually inspired features." International journal of computer vision 103.3 (2013): 348-371. (Year: 2013).*

Cimpoi, Mircea, Subhransu Maji, and Andrea Vedaldi. "Deep filter banks for texture recognition and segmentation." Proceedings of the IEEE conference on computer vision and pattern recognition. 2015. (Year: 2015).*

Bell, Sean, et al. "Material recognition in the wild with the materials in context database." Proceedings of the IEEE conference on computer vision and pattern recognition. 2015.

Hayman, Eric, et al. "On the significance of real-world conditions for material classification." Computer Vision-ECCV 2004 (2004): 253-266.

Deng, Yining, et al. "Unsupervised Segmentation of Color-Texture Regions in Images and Video." *IEEE Transactions on Pattern Analysis and Machine Intelligence* 23.8 (2001): 800-810. (11 pages, in English).

Extended European Search Report dated Nov. 2, 2017 in counterpart European Patent Application No. 17177454.0 (8 pages, in English).

Wei, Li-Yi, et al. "State of the Art in Example-Based Texture Synthesis." *Eurographics 2009, State of the Art Report, EG-STAR.* Eurographics Association, 2009. (25 pages, in English).

Zand, Mohsen, et al. "Texture Classification and Discrimination for Region-Based Image Retrieval." *Journal of Visual Communication and Image Representation* 26 (2015): 305-316. (12 pages, in English).

* cited by examiner

METHOD AND APPARATUS TO PERFORM MATERIAL RECOGNITION AND TRAINING FOR MATERIAL RECOGNITION

CROSS-REFERENCE TO RELATED APPLICATION

This application claims the benefit under 35 USC § 119(a) of Korean Patent Application No. 10-2016-0152428 filed on Nov. 16, 2016, in the Korean Intellectual Property Office, the entire disclosure of which is incorporated herein by reference for all purposes.

BACKGROUND

1. Field

The following description relates to performing material recognition and training for material recognition.

2. Description of Related Art

To classify a human input pattern, research on efficient pattern recognition method of a human to an actual computer is being conducted. One such area of research is artificial neural network that models characteristics of biological nerve cells of a human through mathematical expressions. To classify the input pattern, the artificial neural network employs an algorithm that simulates a learning capability of a human. Through this algorithm, the artificial neural network generates mapping between the input pattern and output patterns. The capability of generating such a mapping is referred to as a learning capability of the artificial neural network. Based on the learning result, the artificial neural network generates an output with respect to an input pattern yet to be used for learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a material recognition method, including acquiring an input image including an object, generating a texture image indicating a texture of the object based on the input image, and recognizing material information from the texture image using a material model.

The generating may include extracting a texture region from the input image, and generating the texture image by extending the texture region.

The extracting may include determining an object region from the input image, and extracting at least a portion of the object region as the texture region.

The extracting of at least a portion of the object region may include extracting a region including a central point of the object region as the texture region.

The extracting of at least a portion of the object region may include extracting a region from the object region at random as the texture region.

The extracting of the texture region may include segmenting the input image into patches, calculating a similarity between the patches, and extracting a region having patches with a similarity greater than or equal to a threshold as the texture region.

The generating may include extending a texture region extracted from the input image.

The generating may include extending a texture region extracted from the input image to maintain a resolution of the texture region to be greater than or equal to a resolution of the input image.

The generating may include extending a texture region extracted from the input image to a size greater than or equal to a size of the input image.

The calculating of the similarity between the patches may include generating intensity histograms for the patches, and calculating a similarity between the intensity histograms of the patches.

The generating may include extending a texture region extracted from the input image to maintain a texture attribute to be greater than or equal to a threshold.

In another general aspect, there is provided a training method for material recognition, the method including extracting a texture region from an object image, generating a texture image by extending the texture region, and generating training data by mapping material information to the texture image.

The method may include training a material model to output the material information from one of the texture image or the object image based on the training data.

The extracting may include determining an object region from the object image, and extracting at least a portion of the object region as the texture region.

The method of claim 12, wherein the extracting of at least a portion of the object region may include extracting a region including a central point of the object region as the texture region.

The extracting of at least a portion of the object region may include extracting a region from the object region at random as the texture region.

The extracting of the texture region may include segmenting the object image into patches, calculating a similarity between the patches, and extracting a region having patches with a similarity greater than or equal to a threshold as the texture region.

The generating may include extending the texture region.

The generating may include extending the texture region to maintain a resolution of the texture region to be greater than or equal to a resolution of the object image.

The generating may include extending the texture region to a size greater than or equal to a size of the object image.

The generating may include extending the texture region to exclude a visual defect.

In another general aspect, there is provided a material recognition apparatus, including a memory configured to store a material model, and a processor configured to acquire an input image including an object, to generate a texture image indicating a texture of the object based on the input image, and to recognize material information from the texture image using the material model.

In another general aspect, there is provided a training apparatus for material recognition, the apparatus including a processor configured to extract a texture region from an object image, to generate a texture image by extending the extracted texture region, and to generate training data by mapping material information to the texture image, and a memory configured to store the training data.

In another general aspect, there is provided a digital device including a sensor configured to capture an image of an object, a memory configured to store instructions, and a processor configured to mask a shape attribute of the object by extracting a texture region from the image of the object, to generate a texture image by extending the extracted texture region, to generate training data by mapping material information to the texture image, to train a neural network using the training data to output the material information, in response to the texture image being input, and to store training data in the memory.

Other features and aspects will be apparent from the following detailed description, the drawings, and the claims.

Figure 1:
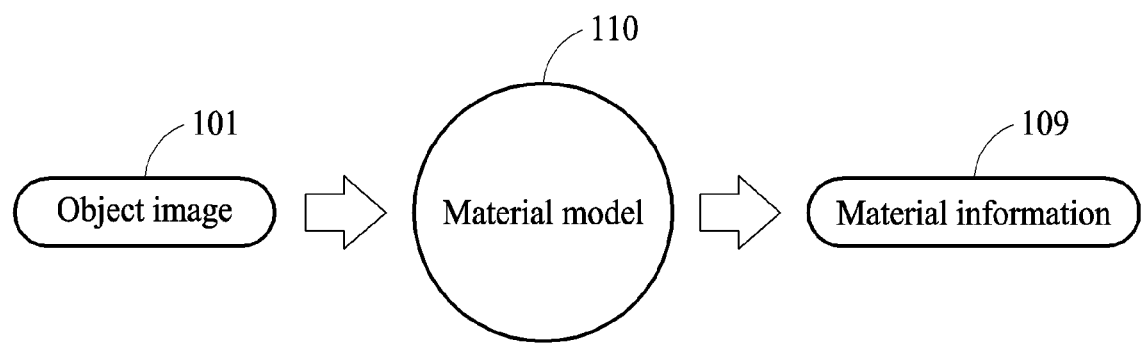
FIG. 1 is a diagram illustrating an example of material recognition using a material model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a diagram illustrating an example of material recognition using a material model in accordance with an embodiment.

A material model 110 is a model used to output material information 109 of an object from an object image 101 that includes the object. In an example, the material model 110 is a neural network, and is trained to output a material corresponding to the object image 101 from the object image 101.

The object image 101 is an image including the object. The object includes, for example, a human, an animal, and a thing included in an image. In the example of FIG. 1, the object image 101 is a color image, the examples are not limited thereto. The object image includes various images, such as, for example, a depth image indicating a depth to the object, an infrared image indicating an intensity of infrared light reflected after projected on the object, and an ultrasonic image indicating an intensity of ultrasonic wave reflected after projected on the object.

The material information 109 is information indicating a material of the object. The material indicates components of a material constituting the object, a characteristic of the material, and information associated with the material. For example, when the object is a wooden chair, a wooden desk, or a wooden cup, the material information 109 indicates wood to be the material. When the object is a metal chair, a metal desk, or a metal cup, the material information 109 indicates metal to be the material. The material includes various materials, such as, for example, paper, wood, metal, and stone.

A training apparatus for material recognition, hereinafter, the training apparatus trains the material model 110 to output a training output from a training input. A material recognition apparatus recognizes the material information 109 from the object image 101 using the material model 110 trained by the training apparatus. Further, the training apparatus augments existing training data to generate training data reflecting a material characteristic. The training apparatus augments training data and excludes a shape attribute of the object, which may not be needed. The training apparatus excludes the shape attribute, thereby improving recognition performance of the material model 110. Thus, the training apparatus secures a large amount of training data that is not skewed to the shape attribute.

The training apparatus and the material recognition apparatus improve recognition of a material attribute of the object. The training apparatus and the material recognition apparatus are applicable to applications that automatically recognize and provide material information of an input object, or retrieve and recommend additional information related to recognized material information. For example, in an application that recognizes model information of a product, the material recognition apparatus recommends a product having a similar material based on recognition of material attribute of the input object. The material recognition apparatus may be implemented as or interoperate with various digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein or various other Internet of Things (IoT) devices that are controlled through a network. The digital devices may be implemented in a smart appliance, an intelligent automobile, and an autonomous driving vehicle including a camera or a vision sensor.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses. Further, the material model 110 includes a single neural network or multiple neural networks.

Figure 2:
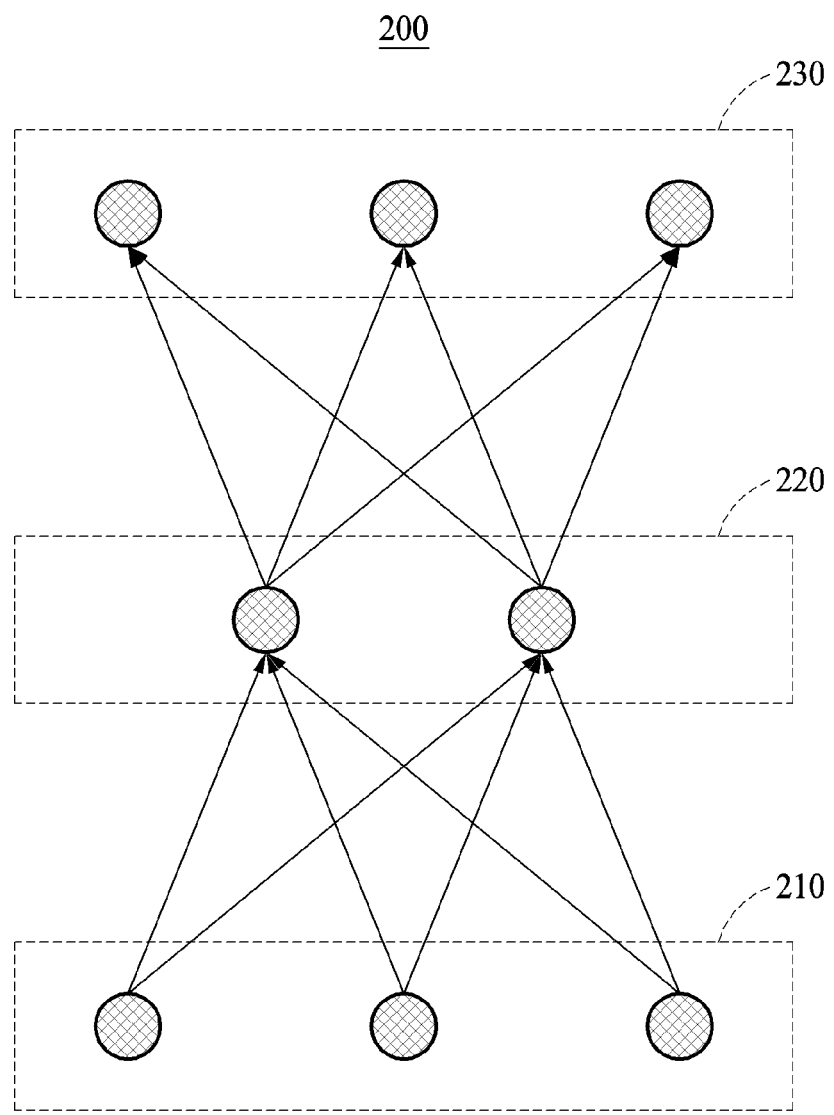
FIG. 2 is a diagram illustrating an example of a neural network.

FIG. 2 is a diagram illustrating an example of a neural network.

A material model includes a neural network 200. A method of performing material recognition based on the neural network 200, an apparatus for performing the method, hereinafter, the material recognition apparatus, a method of training the neural network 200, and an apparatus for training the neural network 200, hereinafter, the training apparatus, are suggested. Herein, recognition includes verification and identification. Verification is an operation of determining whether input data is true or false, and identification is an operation of determining a label indicated by input data, among a plurality of labels.

The neural network 200 includes a plurality of layers, each including a plurality of nodes. The neural network 200 includes connection weights to connect the plurality of nodes included in each of the plurality of layers to a node included in another layer. The training apparatus obtains the neural network 200 from an internal database stored in a memory, or receives the neural network 200 from an external server through a communicator.

For example, the neural network 200 is a recognition model that simulates a computation capability of a biological system using a large number of artificial neurons connected through edges. In an example, the neural network 200 is implemented on a hardware platform. The neural network 200 is referred to as an artificial neural network.

The neural network 200 uses artificial neurons configured by simplifying functions of biological neurons. The artificial neurons may also be referred to as nodes. The artificial neurons are connected to each other through edges having connection weights. The connection weights are predetermined values of the edges, and may also be referred to as synapse weights or connection strengths.

The neural network 200 includes a plurality of layers. For example, the neural network 200 includes an input layer 210, a hidden layer 220, and an output layer 230. The input layer 210 receives an input to be used to perform training or recognition and transmits the input to the hidden layer 220. The output layer 230 generates an output of the neural network 200 based on signals received from the hidden layer 220. The hidden layer 220 is disposed between the input layer 210 and the output layer 230. The hidden layer 220 changes a training input of training data received from the input layer 210 to a predictable value.

The input layer 210, the hidden layer 220, and the output layer 230 each include a plurality of nodes. The nodes included in the input layer 210 may be referred to as input nodes, the nodes included in the hidden layer 220 may be referred to as hidden nodes, and the nodes included in the output layer 230 may be referred to as output nodes.

The input nodes included in the input layer 210 and the hidden nodes included in the hidden layer 220 are connected to each other through edges having connection weights. The hidden nodes included in the hidden layer 220 and the output nodes included in the output layer 230 are also connected to each other through edges having connection weights.

In an example, a neural network may include a plurality of hidden layers. A neural network including a plurality of hidden layers may be referred to as a deep neural network. Training the deep neural network may be referred to as deep learning. Assuming that the hidden layer 220 includes a first hidden layer, a second hidden layer, and a third hidden layer, an output of a hidden node included in the first hidden layer may be connected to hidden nodes belonging to the second hidden layer. An output of a hidden node belonging to the second hidden layer may be connected to hidden nodes belonging to the third hidden layer.

For example, the training apparatus and the material recognition apparatus input outputs of previous hidden nodes included in a previous hidden layer into each hidden layer through edges having connection weights, and generate outputs of hidden nodes included in a hidden layer based on values obtained by applying the connection weights to the outputs of the previous hidden nodes and activation functions. To fire an output to a next hidden node, a result of the activation functions needs to exceed a threshold of a current hidden node. In an example, a node maintains a deactivated state without firing a signal to a next node until a threshold strength of activation is reached through input vectors. In an example, the threshold strength of activation is predetermined.

The training apparatus trains the neural network 200 through supervised learning. The training apparatus may be implemented on a hardware platform. Supervised learning refers to a method of inputting a training input of training data and a corresponding training output into the neural network 200, and updating connection weights of edges so that output data corresponding to the training output of the training data may be output. Although FIG. 2 illustrates the structure of the neural network as a structure of nodes, examples are not limited thereto. Various data structures may be used to store the neural network in a memory storage.

The training apparatus determines parameters of the nodes through a gradient descent scheme which is based on a loss to be back-propagated to the neural network and output values of the nodes included in the neural network. For example, the training apparatus updates the connection weights among the nodes through loss back-propagation learning. Loss back-propagation learning refers to a method of estimating a loss with respect to provided training data through forward computation, and updating connection weights to reduce the loss while propagating the estimated loss in a backward direction from the output layer 230 toward the hidden layer 220 and the input layer 210. Processing of the neural network 200 is performed in an order of the input layer 210, the hidden layer 220, and the output layer 230. However, in the loss back-propagation learning, the connection weights are updated in an order of the output layer 230, the hidden layer 220, and the input layer 210. To process the neural network as desired, one or more processors use a buffer memory configured to store layers or a series of computed data.

The training apparatus defines an objective function to be used to measure currently set connection weights, continuously changes the connection weights based on a result of the objective function, and iteratively performs training. For example, the objective function is a loss function to be used by the neural network 200 to calculate a loss between an actual output value and a value expected to be output with respect to a training input of training data. The training apparatus updates the connection weights to reduce a value of the loss function.

Figure 3:
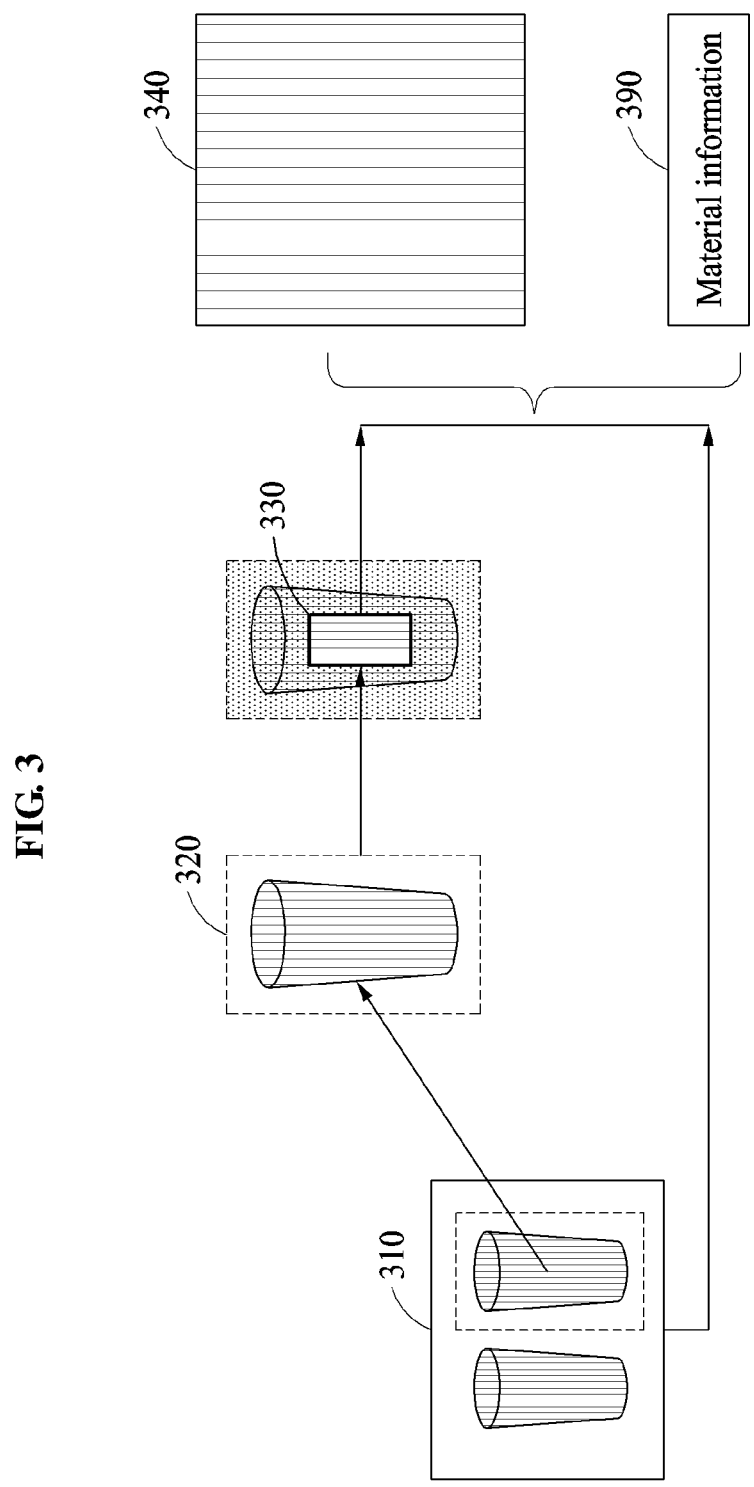
FIG. 3 is a diagram illustrating an example of a process of generating a texture image from an object image.

FIG. 3 is a diagram illustrating an example of a process of generating a texture image from an object image.

Referring to FIG. 3, a training apparatus generates a texture image 340 from an object image 310.

The training apparatus determines an object region 320 from the object image 310. The object region 320 is a region corresponding to an object in the object image 310. In an example, when the object image 310 includes a plurality of objects, the training apparatus determines a region corresponding to one of the objects to be the object region 320. For example, as shown in FIG. 3, the training apparatus determines a bounding box including an object to be the object region 320. In another example, the training apparatus identifies a shape of an object included in the object image 310, and determines a region having a shape corresponding to a contour of the object to be the object region 320. The training apparatus extracts a texture region from a region corresponding to the shape of the object, thereby excluding a background region from extraction.

The training apparatus extracts a texture region 330 from the object region 320. The texture region 330 is a region having a texture representing a material of the object. The texture is a distinguishing, unique characteristic for each material. Extraction of the texture region 330 will be described further with reference to FIGS. 4 and 5.

The training apparatus generates a texture image 340 by extending the extracted texture region 330. The texture image 340 is an image indicating a texture of the material. The texture image 340 has a resolution greater than or equal to a resolution of the object image 310, and a size greater than or equal to a size of the object image 310.

The training apparatus maps material information 390 to the generated texture image 340. The training apparatus generates training data by mapping the material information 390 of the object included in the object image 310 to the texture image 340.

Herein, the training data includes a pair of a training input and a training output, and is used to train a material model. For example, the training apparatus trains the material model to output a training output mapped to a corresponding training input from the training input. In an example, the training output is material information as a label indicating a material. Thus, a trained material model outputs the material information 390 corresponding to the object image 310 when the object image 310 is input. The training data to be augmented includes an attribute associated with a material. Thus, the training apparatus alleviates a variation in accuracy caused by a shape of the object while maintaining an accuracy of material recognition.

Although the operation of FIG. 3 has been described based on the training apparatus, examples are not limited thereto. The material recognition apparatus may also generate the texture image 340 from the object image 310.

Figure 4:
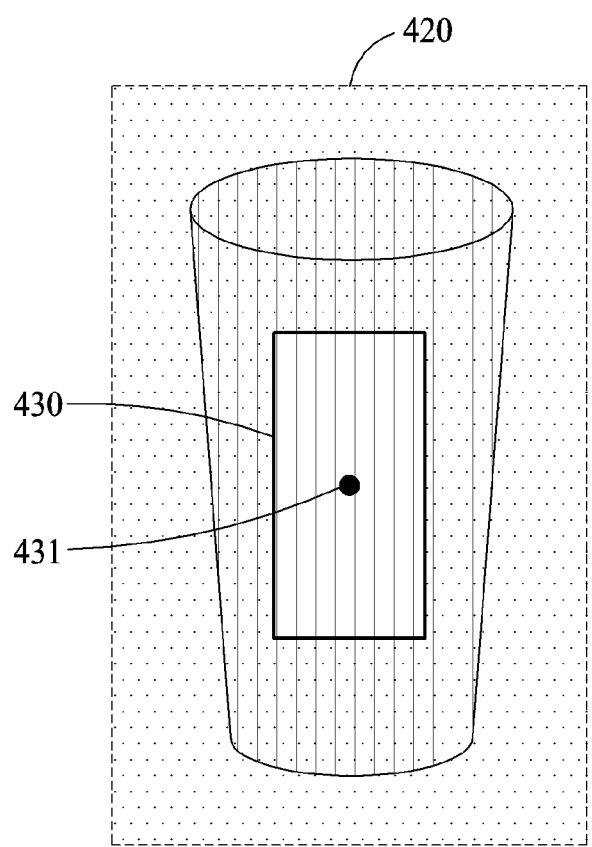
FIGS. 4 and 5 are diagrams illustrating examples of determining a texture region.
Figure 5:
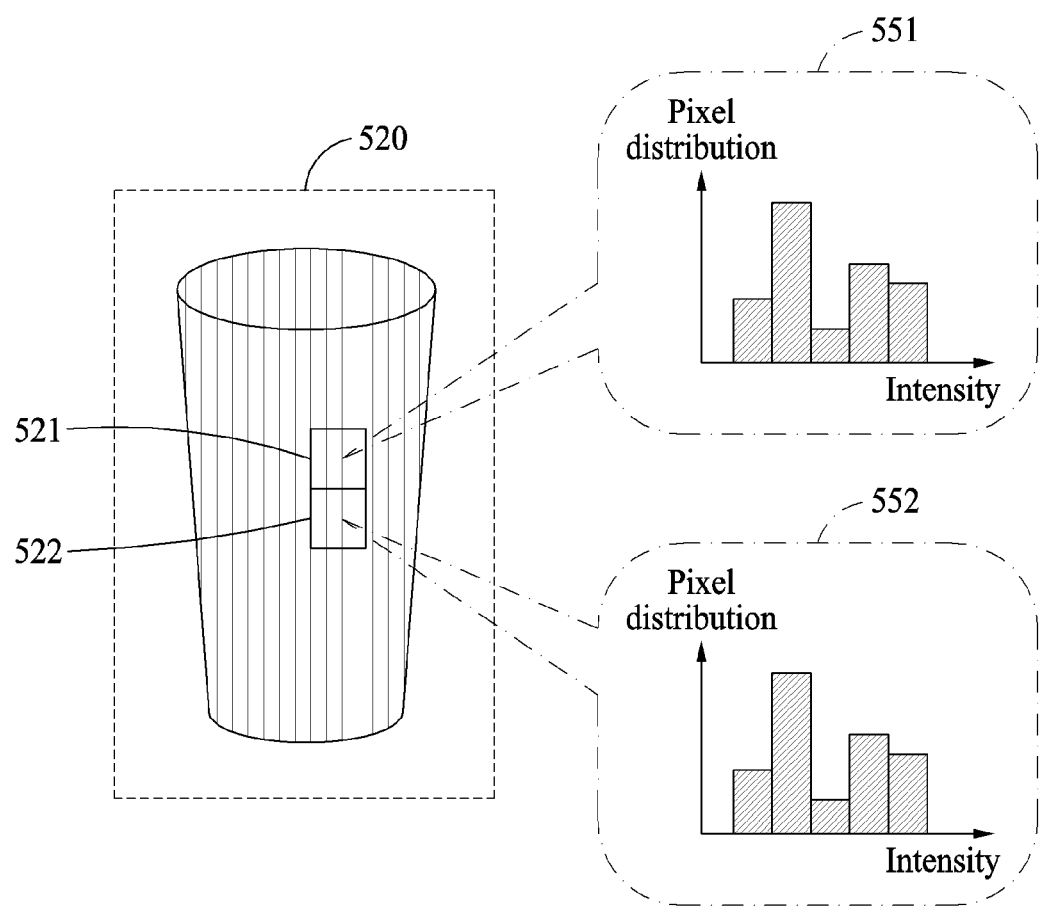

FIGS. 4 and 5 are diagrams illustrating examples of determining a texture region.

Referring to FIG. 4, a training apparatus selects a point in an object region 420, and extracts a texture region 430 from the object region 420 based on the selected point. The training apparatus extracts a region including a central point 431 of the determined object region 420 as the texture region 430. For example, the training apparatus extracts a region of a predetermined size in a vicinity of the central point 431 of the object region 420. In an example, the region of predetermined size is a rectangular or a circular region of a predetermined proportion with respect to the entire object region 420, as the texture region 430. However, examples are not limited thereto, and in another example, the training apparatus extracts a region of a predetermined size from the object region 420 at random as the texture region 430.

Referring to FIG. 5, the training apparatus segments an object region 520 of an object image into a plurality of patches, and extracts a texture region from the object region 520 based on information obtained by analyzing the patches. The training apparatus segments an object image into patches. In an example, the training apparatus calculates a similarity between the patches.

In an example, the training apparatus generates intensity histograms for the patches, and calculates a similarity between the intensity histograms of the patches. An intensity of a pixel is a brightness value of the pixel or an RGB average value of the pixel, for example, an average value of red (R), green (G), and blue (B) of the pixel. The training apparatus calculates an intensity histogram 551 with respect to a first patch 521, and an intensity histogram 552 with respect to a second patch 522. As shown in FIG. 5, an intensity histogram includes an x axis denoting intensity and a y axis denoting pixel distribution, and represents a number of pixels having each intensity in a patch. However, a histogram for similarity calculation is not limited to the intensity histogram, and other types of histograms, such as, a histogram associated with an RGB value of a pixel, may be used without departing from the spirit and scope of the illustrative examples described.

In an example, the training apparatus determines a patch positioned at a center of the object region 520 to be a reference patch, and searches for a patch similar to the reference patch. The training apparatus extracts patches similar to the reference patch and positioned in an internal region as the texture region. In an example, a patch belonging to an outer region of the object image has a low similarity to a patch positioned at a central position of an object image. Thus, the patch belonging to an outer region of the object image is excluded from extraction of the texture region.

In another example, the training apparatus calculates statistics with respect to the patches, for example, RGB average values of pixels in the patches, and calculates a similarity between the statistics of the patches.

The training apparatus extracts a region including patches with a similarity greater than or equal to a threshold similarity as the texture region. For example, the training apparatus calculates a similarity of two patches of the plurality of patches, and extracts a region including the two patches as the texture region when a similarity of the two patches is greater than or equal to the threshold similarity. The training apparatus repeats similarity calculation with respect to each patch, thereby extracting a texture region including patches having similar histograms. Thus, the training apparatus extracts the texture region distinct from a background.

Although the operations of FIGS. 4 and 5 have been described based on the training apparatus, examples are not limited thereto. The material recognition apparatus may similarly extract the texture region from the object region.

Figure 6:
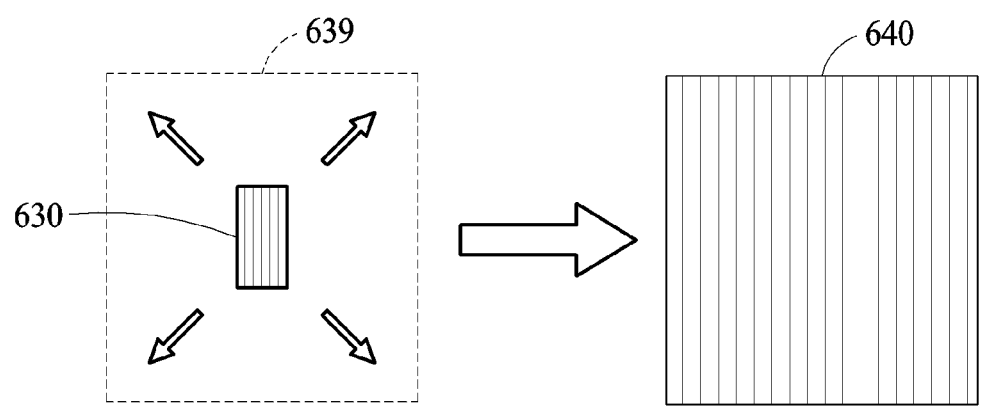
FIG. 6 is a diagram illustrating an example of extending a texture region.

FIG. 6 is a diagram illustrating an example of extending a texture region.

A training apparatus extends a texture region 630 to exclude a visual defect, such as, a defect visually recognizable by a user, and includes a seam corresponding to a boundary line between patches, an unmatched edge, and a simply repeated pattern. The training apparatus extends the texture region 630 while maintaining a texture attribute. For example, the training apparatus extends the texture region 630 to a desired size 639 while maintaining a resolution greater than or equal to a resolution of an object image. In an example, the desired size is predetermined. An image acquired by extending the texture region 630 to the desired size 639 is referred to as a texture image 640.

In an example, the training apparatus determines the extracted texture region 630 to be a seed image. The seed image includes filled pixels, and a remaining region other than the seed image includes unfilled pixels. A filled pixel is a pixel assigned with a color value, and an unfilled pixel is a pixel that is not assigned with a color value. The training apparatus searches the seed image for a patch most similar to filled pixels on the perimeter of an unfilled pixel, for each unfilled pixel bordering filled pixels. In an example, as a size of a patch to be found increases, it is advantageous to extend a pattern of a large structure. Thus, the training apparatus determines a size of a patch based on a structure size of a pattern, and searches for a patch of the determined size. In an example, the training apparatus selects a found patch at random, and assigns a color value to an unfilled pixel from a center of the selected patch. The training apparatus repeats the operation of assigning a color value to an unfilled pixel, thereby extending the texture region 630 to the predetermined size 639.

However, the extension of the texture region 630 is not limited thereto. In an example, the training apparatus may generate patches having similar patterns and apply the generated patches to the edge of the texture region 630 such that the texture region 630 may have a seamless edge.

Although the operation of FIG. 6 has been described based on the training apparatus, example embodiments are not limited thereto. The material recognition apparatus may similarly generate the texture image 640 by extending the texture region 630.

Figure 7:
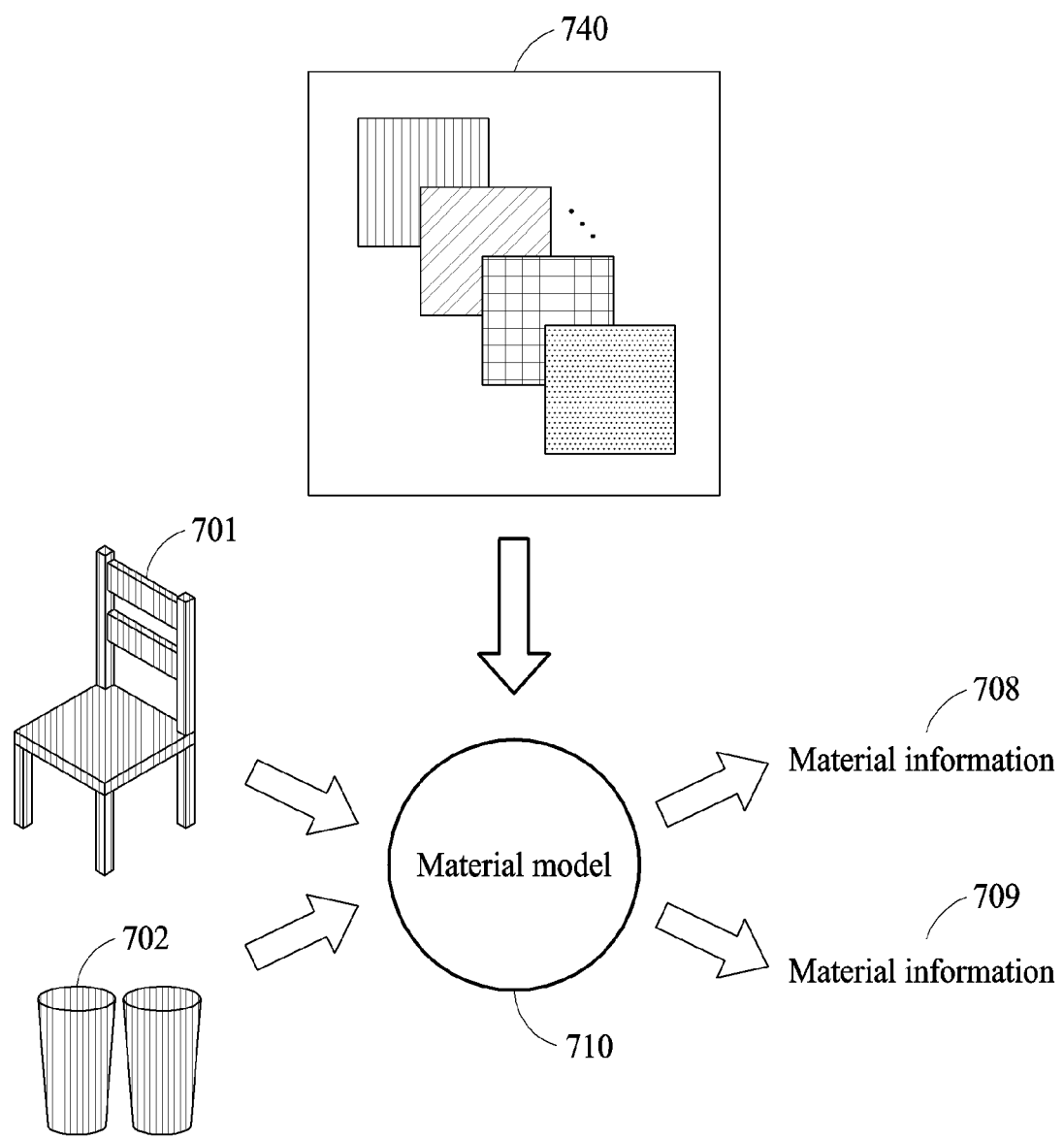
FIG. 7 is a diagram illustrating an example of material recognition using a trained material model.

FIG. 7 is a diagram illustrating an example of material recognition using a trained material model.

Through the process described with reference to FIGS. 1 through 6, a training apparatus generates a texture image reflecting a material characteristic from an object image, and generates training data 740 by mapping material information to the texture image. The training data 740 is data in which the material information is mapped to the texture image. The training apparatus manages the training data 740 by managing the texture image as a training input and the material information as a training output. The training apparatus trains a material model 710, for example, a neural network, to output the training output from the training input.

A material recognition apparatus outputs the material information from an input image including an object using the material model 710. The material recognition apparatus calculates the same material information with respect to objects having different shapes when the objects include the same material. For example, the material recognition apparatus calculates material information 708, for example, a wooden material, from a first object image 701, for example, a chair, using the material model 710. Further, the material recognition apparatus calculates material information 709, for example, a wooden material, which is the same as the material information 708, from a second object image 702, for example, a cup, using the material model 710.

Figure 8:
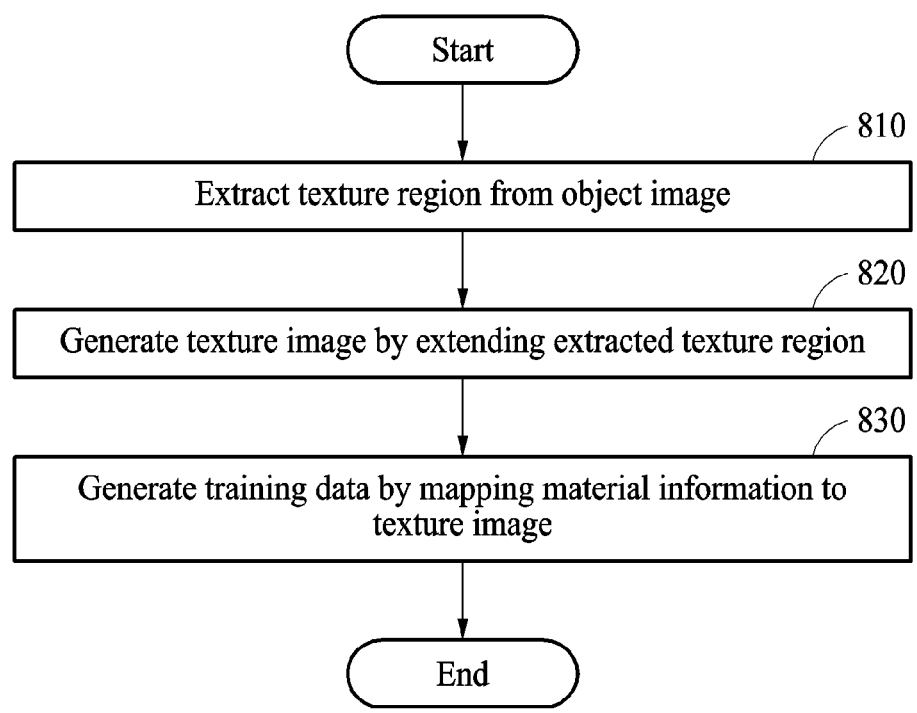
FIGS. 8 and 9 are diagrams illustrating examples of training methods for material recognition.

FIG. 8 is a diagram illustrating an example of training methods for material recognition. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the above descriptions of FIGS. 1-7 are also applicable to FIG. 8, and are incorporated herein by reference. Thus, the above description may not be repeated here.

In 810, a training apparatus extracts a texture region from an object image. The training apparatus determines an object region from the object image. In an example, the training apparatus extracts at least a portion of the determined object region as the texture region. For example, the training apparatus extracts a region including a central point of the determined object region as the texture region. The training apparatus extracts a region of a desired size from the object region at random as the texture region. The training apparatus segments the object image into patches. The training apparatus calculates a similarity between the patches. The training apparatus extracts a region including patches with a similarity greater than or equal to a threshold similarity as the texture region.

In 820, the training apparatus generates a texture image by extending the extracted texture region. The training apparatus extends the texture region to a desired size. In an example, the size is predetermined. The training apparatus extends the texture region while maintaining a resolution greater than or equal to a resolution of the object image. In an example, the training apparatus extends the texture region to a size suitable for training, for example, a size greater than or equal to a size of the object image. The training apparatus extends the texture region to exclude a visual defect.

In 830, the training apparatus generates training data by mapping material information to the texture image.

The training apparatus trains a material model to output the material information from one of the texture image and the object image using the training data.

Figure 9:
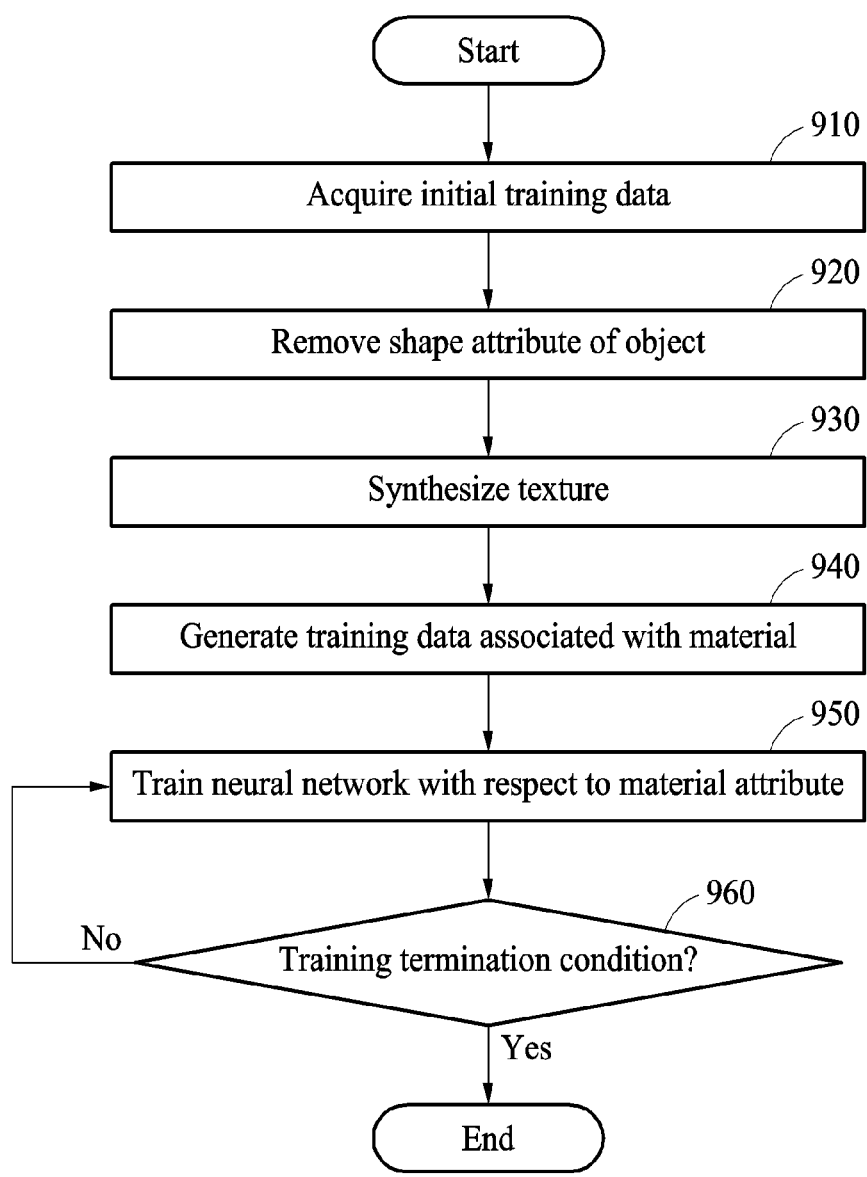

FIG. 9 is a diagram illustrating an example of a training method for material recognition. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the above descriptions of FIGS. 1-8 are also applicable to FIG. 9, and are incorporated herein by reference. Thus, the above description may not be repeated here.

In 910, a training apparatus acquires initial training data. The training apparatus receives the training data from an external device or acquires the training data from an internal database. The initial training data includes, for example, an object image and material information mapped to the object image.

In 920, the training apparatus removes a shape attribute of an object. For example, the training apparatus extracts only a texture attribute and removes the shape attribute by extracting only a texture region from the object image. Thus, the training apparatus removes an outer region from the object image, and retains an internal region indicating a texture. In an example, the training apparatus manually removes the shape attribute in response to a user input.

In 930, the training apparatus synthesizes a texture. The training apparatus generates a texture image by synthesizing patches having textures similar to that of the texture region.

In 940, the training apparatus generates training data associated with a material. The training apparatus generates the training data associated with the material by mapping material information corresponding to the texture image to the texture image.

In 950, the training apparatus trains a neural network with respect to a material attribute. The training apparatus trains the neural network to output the material information, which is a training output, from the texture image, which is a training input.

In 960, the training apparatus determines whether a training termination condition is satisfied. The training apparatus determines that the training termination condition is satisfied in response to determination that a loss between an output calculated using the neural network and the training output is less than a threshold loss. The training apparatus terminates training in response to the training termination condition being satisfied. In response to the training termination condition being not satisfied, the training apparatus returns to 950 to continue the training.

Figure 10:
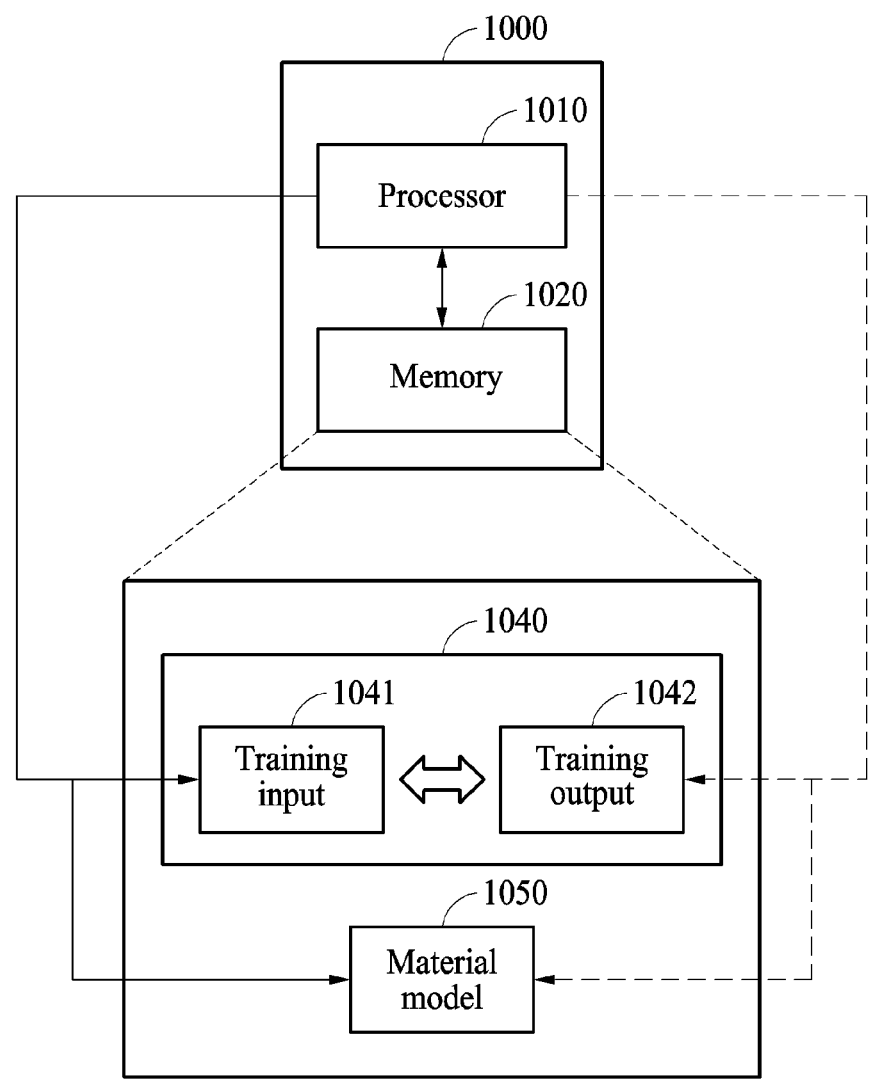
FIG. 10 is a diagram illustrating an example of a configuration of a training apparatus for material recognition.

FIG. 10 is a diagram illustrating an example of a configuration of a training apparatus for material recognition. Referring to FIG. 10, a training apparatus 1000 includes a processor 1010 and a memory 1020.

The processor 1010 extracts a texture region from an object image, generates a texture image by extending the extracted texture region, and generates training data 1040 by mapping material information to the texture image. The processor 1010 trains a material model 1050 to output a training output 1042 from a training input 1041.

The memory 1020 stores the training data 1040.

The operations of the processor 1010 and the memory 1020 are not limited thereto, and the processor 1010 and the memory 1020 may perform operations combined with the operations described with reference to FIGS. 1 through 9.

Figure 11:
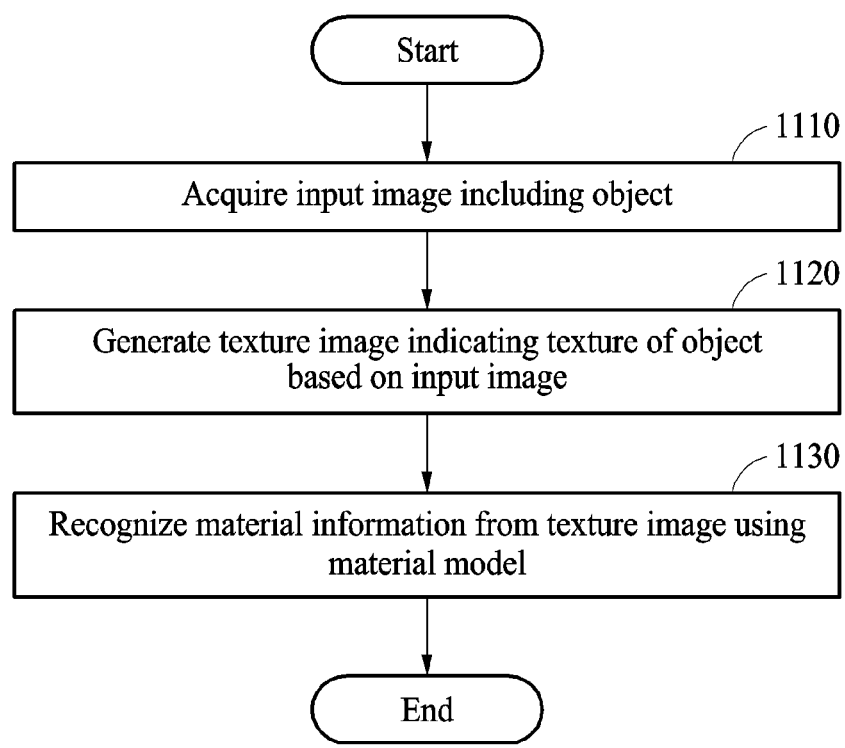
FIGS. 11 and 12 are diagrams illustrating examples of material recognition methods.

FIG. 11 illustrates an example of a material recognition method. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the above descriptions of FIGS. 1-10 are also applicable to FIG. 11, and are incorporated herein by reference. Thus, the above description may not be repeated here.

Referring to FIG. 11, in 1110, a material recognition apparatus acquires an input image including an object. In an example, the material recognition apparatus receives the input image from an external device through wired or wireless communication. In another example, the material recognition apparatus acquires the input image by capturing an external space through a camera provided in the material recognition apparatus.

In 1120, the material recognition apparatus generates a texture image indicating a texture of the object based on the input image. The material recognition apparatus extracts a texture region from the input image, and generates the texture image by extending the texture region. In an example, the material recognition apparatus determines an object region from the input image, and the material recognition apparatus extracts at least a portion of the determined object region as the texture region.

For example, the material recognition apparatus extracts a region including a central point of the determined object region as the texture region. The material recognition apparatus extracts a region of a predetermined size from the object region at random as the texture region. In an example, the material recognition apparatus segments the input image into patches, calculates a similarity between the patches, and extracts a region including patches with a similarity greater than or equal to a threshold similarity as the texture region.

In an example, the material recognition apparatus extends the texture region extracted from the input image to a desired size. The material recognition apparatus extends the texture region extracted from the input image while maintaining a resolution greater than or equal to a resolution of the input image. In an example, the material recognition apparatus extends the texture region extracted from the input image to a size greater than or equal to a size of the input image.

In 1130, the material recognition apparatus recognizes material information from the texture image using a material model. The material recognition apparatus recognizes the material information from the texture image using the material model trained to output a training output from a training input. Although it is described that the material recognition apparatus calculates the material information from the texture image using the material model, in an example, the material recognition apparatus calculates the material information from the input image using the material model.

Figure 12:
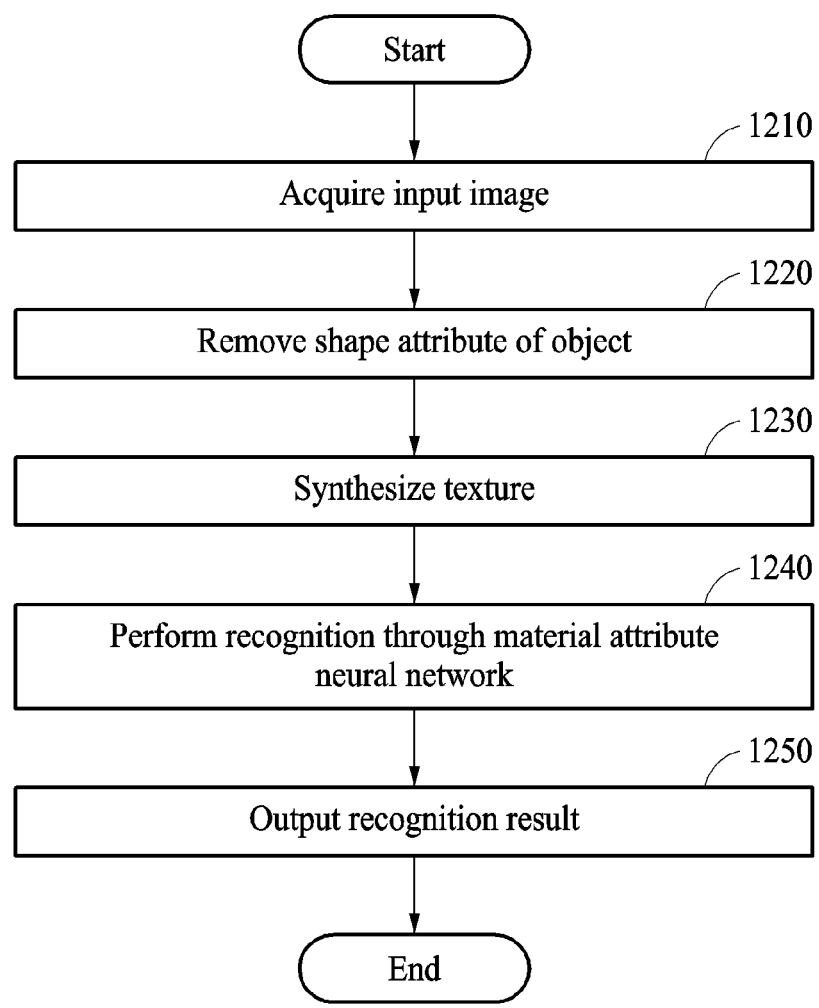

FIG. 12 illustrates an example of a material recognition method. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer that perform the specified functions, or combinations of special purpose hardware and computer instructions. In addition to the description of FIG. 12 below, the above descriptions of FIGS. 1-11 are also applicable to FIG. 12, and are incorporated herein by reference. Thus, the above description may not be repeated here.

Referring to FIG. 12, in 1210, a material recognition apparatus acquires an input image. The material recognition apparatus receives the input image from an external device, or captures the input image using a camera.

In 1220, the material recognition apparatus removes a shape attribute of an object. The material recognition apparatus extracts only a texture attribute from the input image and excludes the shape attribute by extracting only a texture region from the input image.

In 1230, the material recognition apparatus synthesizes a texture. The material recognition apparatus generates a texture image by synthesizing patches excluding a seam with respect to an edge of the texture region.

In 1240, the material recognition apparatus performs recognition through a material attribute neural network. The material recognition apparatus recognizes material information of an object included in the input image using a material model trained based on training data. For example, the material recognition apparatus identifies material information matching the object included in the input image, among a plurality of items of material information. The material recognition apparatus verifies whether the material information matching the object included in the input image matches registered material information.

In 1250, the material recognition apparatus outputs a recognition result. The material recognition apparatus outputs the material information calculated from the input image using the material model. The material recognition apparatus transfers the material information to the external device through communication apparatuses, or displays the material information through a display.

Figure 13:
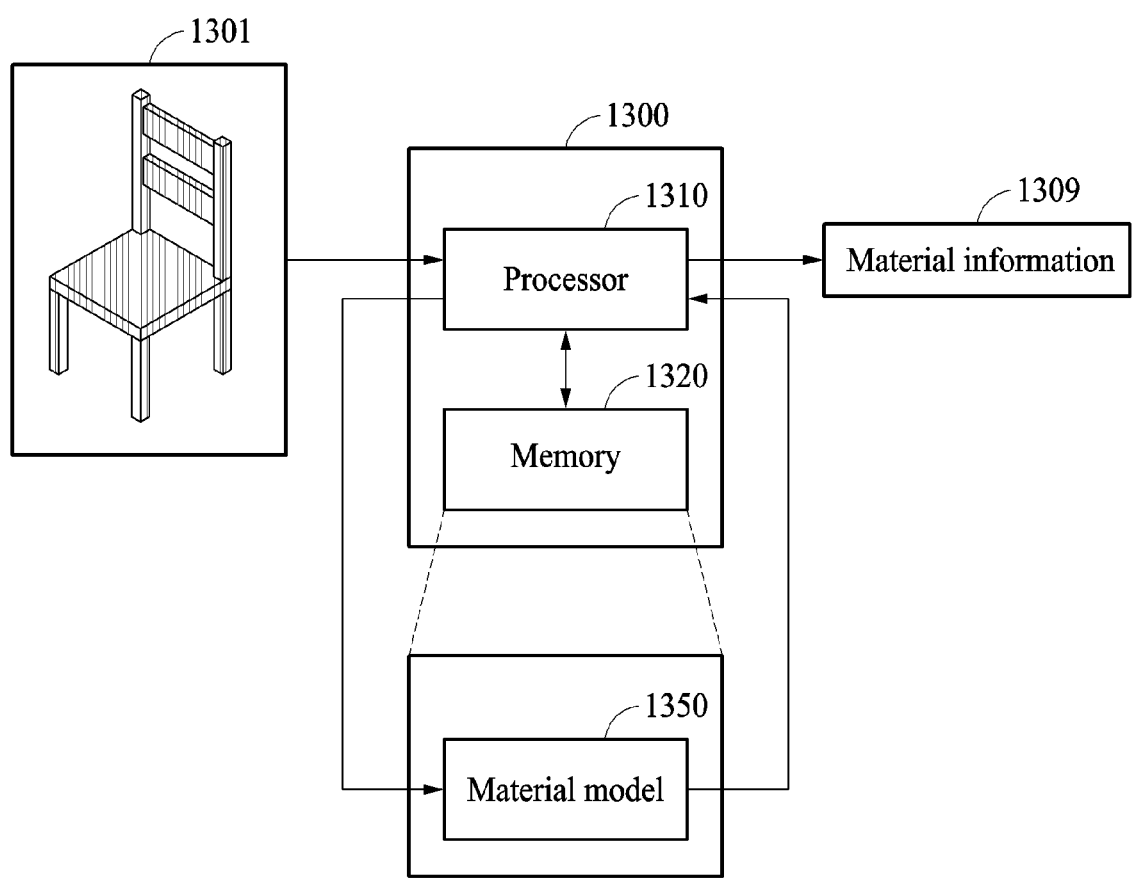
FIG. 13 is a diagram illustrating an example of a configuration of a material recognition apparatus.

FIG. 13 is a diagram illustrating an example of a configuration of a material recognition apparatus.

Referring to FIG. 13, a material recognition apparatus 1300 includes a processor 1310 and a memory 1320.

The processor 1310 acquires an input image 1301 including an object, generates a texture image indicating a texture of the object based on the input image, and recognizes material information 1309 from the texture image using a material model 1350.

The memory 1320 stores the material model 1350. The material model 1350 is a model that is described with reference to FIG. 10.

However, the operations of the processor 1310 and the memory 1320 are not limited thereto, and the processor 1310 and the memory 1320 may perform operations combined with the operations described with reference to FIGS. 1 through 7, 11, and 12.

Figure 14:
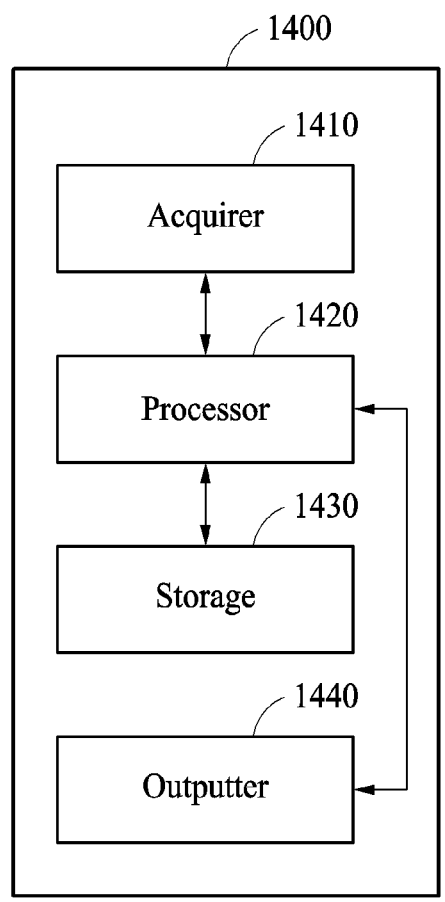
FIG. 14 is a diagram illustrating an example of a configuration of a training apparatus for material recognition.

FIG. 14 is a diagram illustrating an example of a configuration of a training apparatus for material recognition or a material recognition apparatus.

An apparatus 1400 of FIG. 14 may operate as a material recognition apparatus, or operates as a training apparatus for material recognition. The apparatus 1400 includes an acquirer 1410, a processor 1420, a storage 1430, and an outputter 1440.

An example where the apparatus 1400 operates as the material recognition apparatus will be described below.

The acquirer 1410 acquires an input image. In an example, the acquirer 1410 includes a camera to acquire the input image by capturing an external space. In another example, the acquirer 1410 includes a communicator device to receive the input image from an external device.

The processor 1420 calculates material information from the input image using a material model. An operation of the processor 1420 is similar to the operation of the processor described with reference to FIGS. 1 through 13.

The storage 1430 stores the material model. Further, the storage 1430 stores a program including instructions to perform the operations described with reference to FIGS. 1 through 13.

The outputter 1440 outputs the material information calculated by the processor 1420. The outputter 1440 visualizes the calculated material information through a display. In an example, the display may be a physical structure that includes one or more hardware components that provide the ability to render a user interface and/or receive user input. The display can encompass any combination of display region, gesture capture region, a touch sensitive display, and/or a configurable area. In an example, the display can be embedded in the apparatus 1400. In an example, the display is an external peripheral device that may be attached to and detached from the apparatus 1400. The display may be a single-screen or a multi-screen display. A single physical screen can include multiple displays that are managed as separate logical displays permitting different content to be displayed on separate displays although part of the same physical screen. The display may also be implemented as an eye glass display (EGD), which includes one-eyed glass or two-eyed glasses.

A case in which the apparatus 1400 operates as the training apparatus will be described below.

The acquirer 1410 acquires a training input. The acquirer 1410 loads the training input from training data stored in the storage 1430.

The processor 1420 trains a material model to output a training output from the training input. An operation of the processor 1420 is similar to the operation of the processor described with reference to FIGS. 1 through 13.

The storage 1430 stores the training data and the material model. Further, the storage 1430 stores a program including instructions to perform the operations described with reference to FIGS. 1 through 13.

The training apparatus 1000, material recognition apparatus 1300, apparatus 1400, acquirer 1410, outputter 1440, and other apparatuses, units, modules, devices, and other components illustrated in FIGS. 10, 13 and 14 that perform the operations described herein with respect to FIGS. 1 through 9, 11 and 12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 9, 11 and 12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented material recognition method of a computing apparatus, the method comprising:
   acquiring an input image comprising an object;
   excluding shape information of a shape associated with the object based on the input image;
   generating a texture image indicating a texture of the object based on the input image excluding the shape information of the shape;
   recognizing material information from the generated texture image using a trained material recognition model; and
   controlling the computing apparatus based on a result of the recognizing.

2. The material recognition method of claim 1, wherein the generating comprises:
   extracting a texture region from the input image; and
   generating the texture image by extending the texture region to a predetermined size.

3. The material recognition method of claim 2, wherein the extracting comprises:
   determining an object region from the input image; and
   extracting at least a portion of the object region as the texture region.

4. The material recognition method of claim 3, wherein the extracting of at least a portion of the object region comprises extracting a region including a central point of the object region as the texture region.

5. The material recognition method of claim 3, wherein the extracting of at least a portion of the object region comprises extracting a region from the object region at random as the texture region.

6. The material recognition method of claim 2, wherein the extracting of the texture region comprises:
   segmenting the input image into patches;
   calculating a similarity between the patches; and
   extracting a region having patches with a similarity greater than or equal to a threshold as the texture region.

7. The material recognition method of claim 6, wherein the calculating of the similarity between the patches comprise generating intensity histograms for the patches, and calculating a similarity between the intensity histograms of the patches.

8. The material recognition method of claim 1, wherein the generating comprises extending a texture region extracted from the input image.

9. The material recognition method of claim 1, wherein the generating comprises extending a texture region extracted from the input image to maintain a resolution of the texture region to be greater than or equal to a resolution of the input image.

10. The material recognition method of claim 1, wherein the generating comprises extending a texture region extracted from the input image to a size greater than or equal to a size of the input image.

11. The material recognition method of claim 1, wherein the generating comprises extending a texture region extracted from the input image to maintain a texture attribute to be greater than or equal to a threshold.

12. A non-transitory computer-readable medium storing instructions that, when executed by a processor, causes the processor to perform the method of claim 1.

13. A processor-implemented training method for material recognition, the method comprising:
   extracting a texture region from an object image;
   generating a texture image by extending the texture region; and
   generating training data by excluding shape information of object shapes from the training data and by mapping material information to the texture image; and
   training a material recognition model using the training data for the material recognition.

14. The method of claim 13, further comprising:
   training the material recognition model to output the material information from one of the texture image or the object image based on the training data.

15. The method of claim 13, wherein the extracting comprises:
   determining an object region from the object image; and
   extracting at least a portion of the object region as the texture region.

16. The method of claim 15, wherein the extracting of at least a portion of the object region comprises extracting a region including a central point of the object region as the texture region.

17. The method of claim 15, wherein the extracting of at least a portion of the object region comprises extracting a region from the object region at random as the texture region.

18. The method of claim 13, wherein the extracting of the texture region comprises:
   segmenting the object image into patches;
   calculating a similarity between the patches; and
   extracting a region having patches with a similarity greater than or equal to a threshold as the texture region.

19. The method of claim 13, wherein the generating comprises extending the texture region to a predetermined size.

20. The method of claim 13, wherein the generating comprises extending the texture region to maintain a resolution of the texture region to be greater than or equal to a resolution of the object image.

21. The method of claim 13, wherein the generating comprises extending the texture region to a size greater than or equal to a size of the object image.

22. The method of claim 13, wherein the generating comprises extending the texture region to exclude a visual defect.

23. A computing apparatus, comprising:
   a memory configured to store a trained material recognition model; and
   a processor configured to:
     acquire an input image comprising an object;
     exclude shape information of a shape associated with the object based on the input image;
     generate a texture image indicating a texture of the object based on the input image excluding the shape information of the shape;
     recognize material information from the generated texture image using the trained material recognition model; and
     control the computing apparatus based on a result of the recognizing.

24. A training apparatus for material recognition, the apparatus comprising:
a processor configured to:
extract a texture region from an object image;
generate a texture image by extending the extracted texture region;
generate training data by excluding shape information of object shapes from the training data and by mapping material information to the texture image; and
perform a training of a material recognition model using the training data for the material recognition; and
a memory configured to store the training data and the trained material recognition model.

25. A digital device comprising:
a sensor configured to capture an image of an object;
a memory; and
a processor configured to:
mask a shape attribute of the object, by extracting a texture region from the image of the object;
generate a texture image by extending the extracted texture region;
generate training data by excluding shape information of object shapes from the training data and by mapping material information to the texture image;
train a neural network using the training data to output the material information, in response to the texture image being input; and
store the training data and the trained neural network for material recognition in the memory.

* * * * *